3,605,787
POLYJET VALVE
Ralph J. Krogfoss, San Mateo, and Robert W. Dixon, Concord, Calif., assignors to Chas. M. Bailey Co., Inc.
Filed Dec. 4, 1969, Ser. No. 882,098
Int. Cl. F16k 1/06
U.S. Cl. 137—219           7 Claims

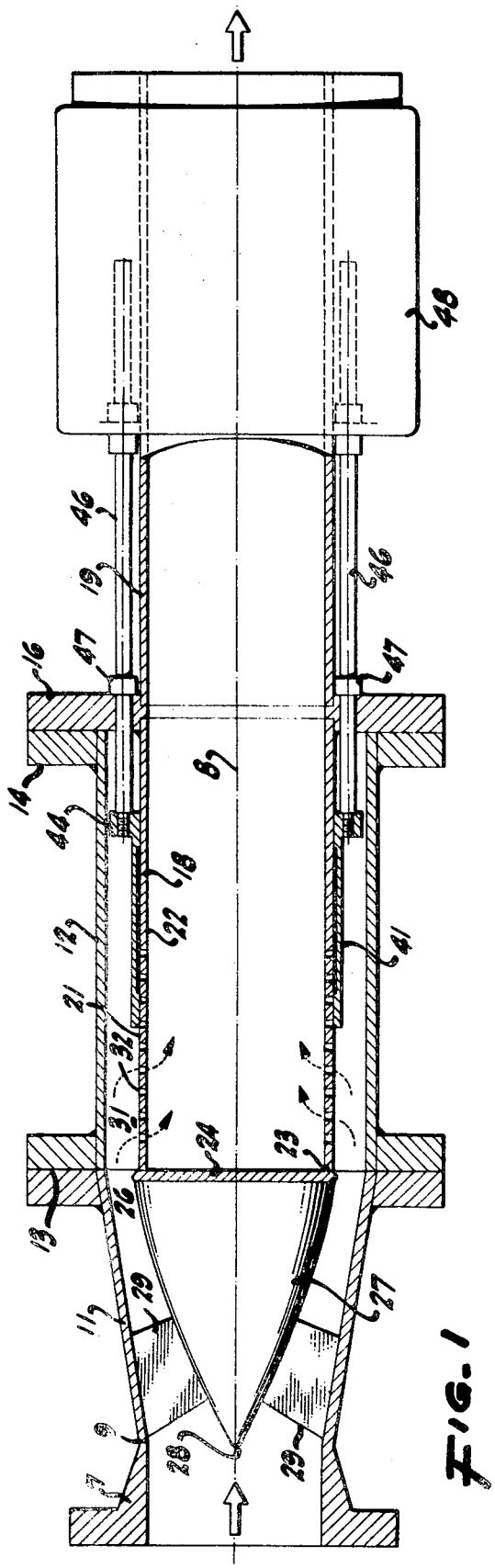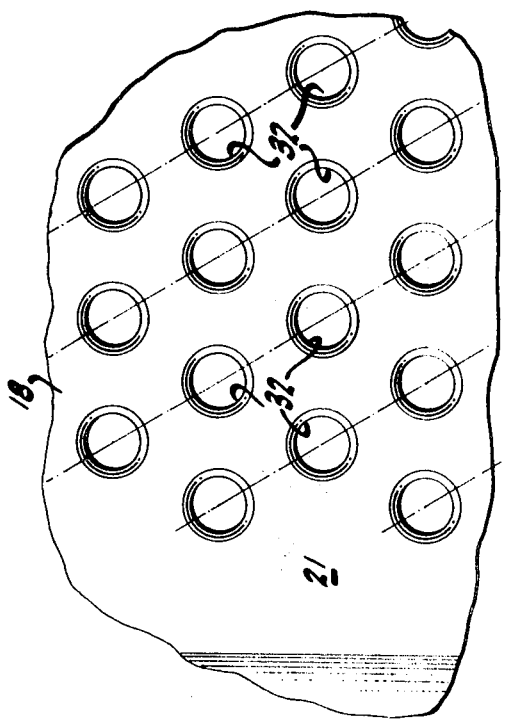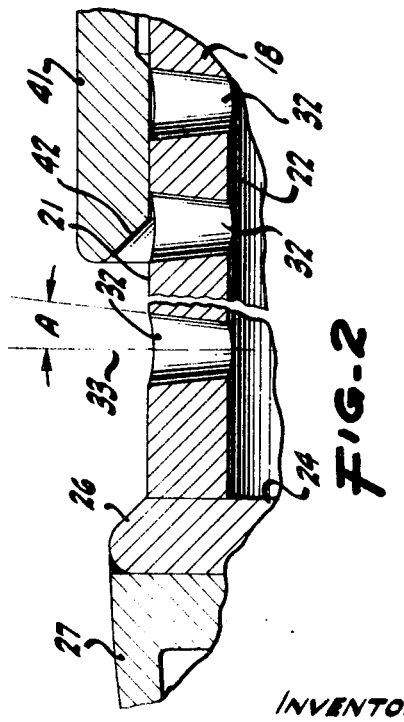

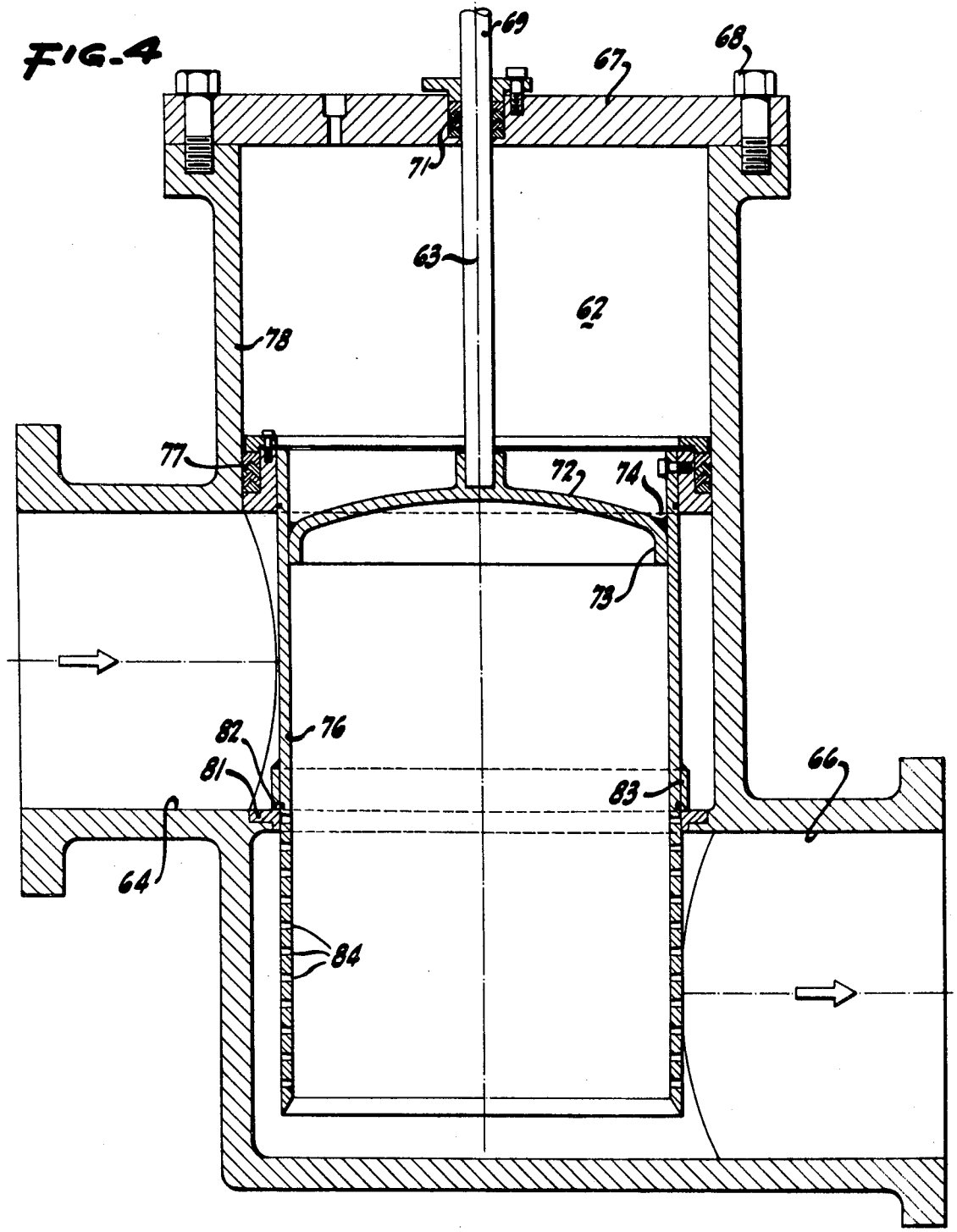

ABSTRACT OF THE DISCLOSURE

A polyjet valve for throttling hydraulic flow includes a housing having a liquid inlet and a liquid outlet. A tube of circular cylindrical form is disposed within the housing and at one end is interiorly connected to the outlet. The other end of the tube is closed. The tube is pierced by an exceptionally large number of holes. The relationship of these holes is determined by the formulas:

$$D_H = \frac{\text{from 0.2 to 0.4} ID_T}{12}$$

wherein $D_H$ is the diameter in inches of a typical hole and $ID_T$ is the diameter of the tube in inches and $$H_S = \text{from 2.0 to 3.5} D_H$$

wherein $H_S$ is the center to center distance of adjacent holes. The tube wall thickness is between 1.0 and 2.0 times the hole minimum diameter. The holes in the aggregate have a flow area approximately equal to the flow area through the tube. A solid sleeve in the housing and surrounding the tube on the high pressure side is relatively movable along the tube by means operable from outside the housing.

---

Our invention relates to the control of the flow of hydraulic fluid, usually water, in a pipeline and is particularly concerned with controlling flow in a pipeline wherein the pressure of the incoming liquid must be substantially reduced in the valve in order to be discharged at a considerably lower pressure.

Valves of this sort are utilized in water projects; for example, in the Central Valley Project in California where at numerous locations water which has been pumped to the top of a relatively high mountain must be brought down the other side of the mountain to a low elevation and must have its pressure substantially reduced in descending in order that it not burst the pipeline nor issue from the pipeline with a destructive force. Presently known valves for this purpose can accommodate only a relatively small pressure drop between valve inlet and valve outlet necessitating the use of a large number of valves in series in order to attain the desired total pressure drop. In some instances where large pressure drops per valve have been attempted, the valves have had extremely short lives because the water in flowing through the valve cavitates and destroys the valve material. In a surprisingly short time the valve is no longer serviceable. Also, the cavitation is attended by a loud noise so such valves cannot be used near dwellings. Alternatively, some energy absorbers have been considered as reducers but these, too, are subject to cavitation and do not lend themselves to a variable pressure drop which is greatly preferred. There is a need in this particular field for a valve providing a much larger than usual pressure drop yet not subject to cavitation and early destruction and able to vary from time to time its pressure reducing capacity.

It is therefore an object of the invention to provide an improved valve.

Another object of the invention is to provide a valve effective to produce a relatively great pressure drop through the valve yet not subject to any appreciable or substantial cavitation and, hence, having a relatively long life.

Another object of the invention is to provide a valve of the described sort which can be varied from time to time in its capacity.

A further object of the invention is to provide a valve of the sort described which, while perhaps somewhat more expensive than usual to make, is still less expensive than a series of other types of valve for the same pressure drop.

A further object of the invention is to provide a throttling valve which can easily be controlled.

A still further object of the invention is to provide a valve which can readily be inspected and repaired if necessary.

A further object of the invention is to provide a valve of improved characteristics that can be fabricated with ordinary materials and facilities.

Other objects together with the foregoing are attained in the embodiments of the invention described in the accompanying description and illustrated in the accompanying drawings, in which:

FIG. 1 is a cross-section on an axial plane through one form of valve constructed pursuant to the invention;

FIG. 2 is an enlarged detail in cross-section, the plane being the same as in FIG. 1;

FIG. 3 is an enlarged detail showing in development the preferred form and pattern of holes in the tube; and FIG. 4 is a cross-section on an axial plane through a modified form of valve pursuant to the invention.

For one particular installation a valve pursuant to the disclosure has been fabricated as especially illustrated in FIG. 1. While the figure is not exactly to scale, it is roughly true to proportion and indicates a valve having a nominal eight inch internal diameter. In this valve there is provided a housing 6 having an inlet section 7 and disposed symmetrically about a longitudinal axis 8. The inlet section 7 extends to a point of flexure 9 at which the inlet section is joined to a diverging cone 11 leading to a body section 12 extending beyond a flanged junction 13. The body section is substantially circular cylindrical about the axis 8 and terminates in an outwardly extending flange 14 paired with a companion flange 16 secured in place by the customary fastenings, not shown. The flange 16 is reduced in diameter and at its inner margin 17 is joined to a tube 18 having the same nominal inside diameter as the section 7. The tube 18 is open at its downstream or outlet end and communicates with a pipe 19 leading to any suitable point of discharge.

The tube 18 is coaxial with and for the most part is disposed within the cylindrical body section 12. The wall of the tube 18 has an outside surface 21 parallel to the inside surface 22 of the section 12, the distance between the surfaces 21 and 22 measured in a radial direction defining the radial thickness of an annulus having a cross-sectional area for flow which is the same as that of the inlet of the section 7.

The upstream end 23 of the tube near the junction 13 is provided with a closure plate 24 united to the tube 18 in any suitable way, for example, by welding. The plate 24 extends radially beyond the surface 21 and is beveled to provide a conical seat 26. In order that flow toward the closure 24 will be relatively smooth and uniform, there is provided a nose cone 27 having an approximately parabolic exterior contour. The nose cone is disposed symmetrically on the axis 8 with the tip 28 of the nose cone disposed near the flexure point 9.

The nose cone is supported in position by a plurality of narrow fins 29 extending axially and radially. The fins 29 are positioned as close as possible to the tip 28 and extend only part way back toward the plate 24. Any disturbance in flow due to the interposition of the fins has plenty of room to dissipate or to be damped out before the flow passes over the seat 26. The entrance arrangement is designed to have substantially constant cross-sectional flow area so as to disturb the velocity of flow of the incoming water as little as possible and to discourage and inhibit eddying or turbulence in the stream. As nearly as possible the incoming water tends to flow into the annular space 31 between the tube 18 and the interior of the body section 12 with practically no turbulence.

Particularly in accordance with the invention, the tube 18 is provided with an extraordinarily large number of restricted flow holes 32 therein. We have found by extended experimentation and carefully controlled tests that the objects of the invention are most nearly attained when the size (i.e. diameter, in the case of circular holes) of the holes is controlled. In the usual case, wherein all of the holes have the same nominal diameter we have found in our tests that the diameter of each hole can be determined from the following empirical formula:

$$D_H = \frac{\text{from } 0.2 \text{ to } 0.4 ID_T}{12}$$

wherein $D_H$ is the diameter in inches of the hole, and $ID_T$ is the diameter of the tube, such as the tube 18, in inches. For a nominal 8 inch tube this substitutes as follows:

$$D_H = \frac{0.2 \ (8 \text{ inches})}{12} = 0.133 \text{ inch}$$

and $$D_H = \frac{0.4 \ (8 \text{ inches})}{12} = 0.266 \text{ inch}$$

For discussion, this range can be approximated as averaging in the vicinity of one quarter of an inch. The thickness of the tube wall is between 1.0 and 2.0 times the minimum hole diameter.

These holes are preferably provided in a sufficient number so that the aggregate area of the holes approximates the flow area of the pipe. That is, a quarter inch hole has a flow area of 0.0491 square inch so that to provide a total flow area of about fifty square inches, corresponding to that of an eight inch diameter pipe, approximately nine hundred to a thousand holes are provided.

The location and spacing of the holes are arranged with care. The distance between any two adjacent holes is determined by the empirical formula:

$$H_S = \text{from } 2.0 \text{ to } 3.5 D_H$$

wherein $D_H$ is as before and $H_S$ is the distance between hole centers. For a nominal hole diameter of one quarter of an inch this substitutes as follows:

$$H_S = 2.0 \ (.25 \text{ inch}) = 0.500 \text{ inch}$$

and $$H_S = 3.5 \ (.25 \text{ inch}) = 0.875 \text{ inch}$$

Furthermore, the positioning of the holes is preferably in a helical pattern so that the flow action through adjacent holes tends to be noninterfering. The point is to provide such a large number of holes that the individual holes are relatively small and are so spaced that the jet discharging from each individual hole has its energy dissipated by the shearing action of the water without the jet interacting with the jet discharge from any adjacent hole. By extensive tests it has been demonstrated (by observation with dyes, hydrophones and accelerometers and by observation of the parts after extensive use) that there is no detectable cavitation in the structure and the operation is quiet.

The holes closest to the closure 24 are not positioned immediately adjacent thereto but themselves are spaced axially downstream a distance from the barrier at least equal to four times the diameter of the holes themselves. Additionally, attention is paid to the configuration of the individual holes. Ideally, and if cost were no object, it would be preferred to bore the holes into the wall of the tube from the outside with the axis of each hole extending radially inwardly and with the configuration of the hole approximating a venturi section. This would afford a rounded inlet, a narrow throat and a gradually diverging outlet. This construction is so expensive as to be virtually prohibitive. However, most of the advantages of such configuration can be attained by providing, as shown in FIG. 2, a configuration of each hole according to which the hole is conical with the sides of the hole converging inwardly at an angle A of about 5.75 degrees to the hole axis 33. In providing this economical configuration it is not difficult also to provide slightly rounded inlets to the holes and thus get improved results.

While it may be well known to provide a valve tube having a few holes in it, we believe it is unique and special to provide a tube having a very large number of holes, say several hundred holes; that is to say, a tube that divides the flow through the entrance member into several hundred smaller flows for control purposes. Since the tube has so many jet perforations, we refer to a valve of this type as a "polyjet" valve. Our work shows that a construction with only a few holes in subject to substantial cavitation even at relatively small pressure drops, while our construction, as explained herein, has not yet been found subject to cavitation even at extremely large pressure drops.

The valve as so far decribed can be used in the event a constant pressure drop across the valve is desired. But there are cases wherein it is desired that the pressure drop be varied and that the valve be shut off entirely. For that reason we provide within the housing 12 and preferably slidable along the tube 18 on the upstream or high pressure side thereof a sleeve 41 coaxial with the tube and having a valve seat 42 at its upstream end. The seat 42 is designed in one extreme position to abut the seat 26 and to preclude flow therebetween. The sleeve otherwise is an imperforate cylinder having an interior relief 43 for manufacturing and operational purposes. At one end the sleeve has a ring 44 to which actutaing rods 46 are moved axially by any suitable structure 48 well known and not illustrated in detail.

In one extreme position of the sleeve 41 all of the holes 32 are uncovered and the valve operates at its maximum flow capacity. In another extreme position of the sleeve 41 all of the holes are covered and the seats 26 and 42 are in abutment so that the valve has no flow capacity. The sleeve 41 can be positioned at any intermediate location so that as many as desired of the holes are uncovered to permit the valve to operate at partial capacity.

We have found that it is essential that the control sleeve be located on the high pressure side of the tube so that the sleeve is away from the water leaving the holes and thus is not subject to any disturbances which might produce cavitation at the sleeve.

For most installations we prefer to have all of the valve parts arranged coaxially, as shown in FIG. 1, but there are instances in which a somewhat less expensive, more conventional configuration is acceptable. For that reason we provide a polyjet valve as shown in FIG. 4 having a housing 61 with a central enclosure 62 symmetrical about an axis 63. The housing includes an inlet section 64 and an outlet section 66 axially offset with respect to each other. The housing is closed at the top or one end by a removable cap 67 secured in place by removable fasteners 68. An operating stem 69 passes through a packing arrangement 71. At one end the stem 69 carries an end disc 72 having a flange 73 secured by welding 74 to a valve tube 76. For part of its length the tube, as before, is perfectly smooth and is a circular cylinder coaxial with the axis 63. The sleeve at one end carries a packing mechanism 77 slidable on the interior finished cylindrical wall 78 of the housing 61. The sleeve also is slidable within a seat ring tube 81 extending around the interior of the housing and tightly secured therein. The seat ring tube 81 has a conical terminus 82 against which a similarly shaped seat band 83 secured to the solid portion of the tube 76 may abut.

The tube 76 adjacent the other end and beyond the solid portion is provided with a large number of holes 84. These holes are constructed and arranged and are present in numbers substantially as previously indicated. They are of relatively small diameter and are spaced and arranged in helical paths centered on the axis 63. Each of the holes has a configuration so that the hole wall 86 is tapered and converges inwardly toward the axis 63.

In the closed position of the valve, as shown in FIG. 4, only the solid portion of the sleeve 76 is presented to the incoming liquid within the inlet 64. As the stem 69 is raised the seat band 83 lifts from the seat ring tube 81 and the next adjacent holes 84 are uncovered. Flow is thus past the band 83 and through the tube wall from the upstream side (the high pressure side) to the downstream side (the low pressure side) and such flow discharges through the outlet 66. When the stem 69 has been fully raised all of the holes 84 are utilized to throttle the flow through the valve. Any intermediate position of the valve tube 76 can likewise be selected so that the seat ring tube 81 permits only some of the valve holes to be effective.

By actual test on advanced hydraulic test equipment it has been demonstrated that a polyjet valve constructed in accordance with the disclosure herein will successfully afford a much greater than usual pressure drop through the valve without any cavitation at all flow rates. This is evidenced partly because the valve is quiet in its ordinary operation as distinguished from the loud "singing" which ordinarily accompanies pressure drop in hydraulic valves of this sort, and also is evidenced by the fact that after protracted and accelerated wear tests the valves do not show any deleterious effects from cavitation.

Representative test results with an 8-inch (diameter) valve show that the cavitation index, sigma, is as follows:

| Hole size | Hole spacing | Sigma value |
|---|---|---|
| .125 | .401 | .95–1.0 |
| .1875 | .401 | 1.0 |
| .250 | .570 | 1.15 |
| .375 | .835 | 1.35 | wherein $$\text{sigma} = \frac{\text{downstream head (feet)} + 33}{\text{differential head across valve (feet)}}$$

What is claimed is:

1. A polyjet valve comprising a housing having a liquid inlet and a liquid outlet; a tube having a wall and disposed within said housing and interiorly connected to said outlet at one end; means for closing the other end of said tube; means defining a plurality of holes through said tube wall according to the following formula $$D_H = \frac{\text{from 0.2 to 0.5 } ID_T}{12}$$

wherein $D_H$ is the diameter in inches of a typical hole and $ID_T$ is the diameter of said tube in inches; and according to the following formula $$H_S = \text{from 2.0 to 3.5 } D_H$$

wherein $D_H$ is as before and $H_S$ is the center to center distance of adjacent holes; and according to the following formula $$T_W = \text{from 1.0 to 2.0 } D_H$$

where $D_H$ is as before and $T_W$ is the tube wall thickness; and said holes in the aggregate having a flow area approximately equal to the flow area through said tube; a solid sleeve in said housing surrounding said tube on the high pressure side thereof and relatively movable along said tube; and means operable from outside said housing for moving said sleeve relative to said tube.

2. A device as in claim 1 in which said holes have inwardly converging configurations.

3. A device as in claim 1 in which said tube is circular-cylindrical about an axis, and said holes are arranged with their centers in paths helical about said axis of said tube.

4. A device as in claim 1 in which said holes are disposed substantially uniformly around and along said tube.

5. A device as in claim 1 in which said holes in said tube closest to said closing means are spaced from said closing means by a distance at least equal to four times the diameter of said holes.

6. A device as in claim 1 in which said tube has a first seat projecting radially from said tube at one end and said sleeve has a second seat at the adjacent end positioned to abut said first seat when said sleeve is in one extreme position on said tube.

7. A device as in claim 1 in which said liquid inlet, said liquid outlet, said tube, and said sleeve are all coaxial.

References Cited

UNITED STATES PATENTS

| 193,134 | 7/1877 | Andrews | 137—625.38 |
| 1,230,777 | 6/1917 | Quandt et al. | 137—625.38 |
| 2,091,482 | 8/1937 | McCreary et al. | 137—625.39X |
| 2,596,534 | 5/1952 | Crake | 137—625.39X |
| 3,112,764 | 12/1963 | Anderson et al. | 137—625.39X |
| 3,451,404 | 6/1969 | Self | 137—625.38X |

FOREIGN PATENTS

| 801,510 | 1/1951 | Germany | 137—625.3 |
| 859,245 | 12/1952 | Germany | 137—219 |
| 1,067,517 | 1/1954 | France | 137—625.39 |

M. CARY NELSON, Primary Examiner

M. O. STURM, Assistant Examiner

U.S. Cl. X.R.

137—625.38